(12) United States Patent
Liu et al.

(10) Patent No.: US 9,807,596 B2
(45) Date of Patent: Oct. 31, 2017

(54) REMOTE WIRELESS SMART CARD PERMITTING SWITCHING BETWEEN SERVICES, TERMINAL THEREOF AND COMMUNICATION SYSTEM FOR USE THEREOF

(75) Inventors: Jing Liu, Shenzhen Guangdong (CN); Yuan Shen, Shenzhen Guangdong (CN); Wei Ren, Shenzhen Guangdong (CN)

(73) Assignee: Simo Holdings, Inc., Grand Cayman (KY)

( * ) Notice: Subject to any disclaimer, the term of this patent is extended or adjusted under 35 U.S.C. 154(b) by 125 days.

(21) Appl. No.: 14/401,907

(22) PCT Filed: Jul. 30, 2012

(86) PCT No.: PCT/CN2012/079326
§ 371 (c)(1),
(2), (4) Date: Mar. 10, 2015

(87) PCT Pub. No.: WO2013/174078
PCT Pub. Date: Nov. 28, 2013

(65) Prior Publication Data
US 2015/0181410 A1    Jun. 25, 2015

(30) Foreign Application Priority Data
May 22, 2012 (CN) .......................... 2012 1 0160342

(51) Int. Cl.
*H04M 3/00* (2006.01)
*H04W 8/18* (2009.01)
(Continued)

(52) U.S. Cl.
CPC ........ *H04W 8/183* (2013.01); *G06K 7/10297* (2013.01); *H04W 4/003* (2013.01); *H04W 12/04* (2013.01); *H04W 88/02* (2013.01)

(58) Field of Classification Search
None
See application file for complete search history.

(56) References Cited

U.S. PATENT DOCUMENTS

2004/0235450 A1* 11/2004 Rosenberg ........... G06Q 20/085
                                                       455/406
2012/0072350 A1*  3/2012 Goldthwaite ........ G06K 7/0004
                                                        705/44

FOREIGN PATENT DOCUMENTS

CN    101345932 A    1/2009
CN    201503599 U    6/2010
(Continued)

OTHER PUBLICATIONS

Espacenet English abstract of CN 101345932 A.

*Primary Examiner* — Idowu O Osifade
(74) *Attorney, Agent, or Firm* — Ladas & Parry LLP

(57) ABSTRACT

The present invention provides a remote wireless smart card comprising: a smart-card model, used to be arranged in a smart-card terminal unit for the conductive connection between the card model and the smart-card terminal unit as well as the electrical signal transfer between the smart-card terminal unit and the control module; a control module, used for parsing and analyzing the interface protocol between a smart-card terminal and the destination smart card and for executing the communication protocol with the destination smart card control equipment; and a wireless communication module, used for wireless communication via the wireless network between the remote wireless smart card and the destination smart card control equipment.

16 Claims, 8 Drawing Sheets

(51) Int. Cl.
    *G06K 7/10*     (2006.01)
    *H04W 88/02*     (2009.01)
    *H04W 4/00*     (2009.01)
    *H04W 12/04*     (2009.01)

(56) References Cited

FOREIGN PATENT DOCUMENTS

| CN | 102054190 A | 5/2011 |
| CN | 102449596 A | 5/2012 |

\* cited by examiner

REMOTE WIRELESS SMART CARD PERMITTING SWITCHING BETWEEN SERVICES, TERMINAL THEREOF AND COMMUNICATION SYSTEM FOR USE THEREOF

RELATED APPLICATION

This application is a national phase entry under 35 USC 371 of the International Patent Application No PCT/CN2012/079326 filed on 30 Jul. 2012, which was published in the English Language on 28 Nov. 2013 with International Publication Number WO 2013/174078 A1, which claims priority from Chinese Patent Application No. 201210160342.0 filed on May 22, 2012, the disclosures of which are incorporated in their entirety by reference herein.

TECHNICAL FIELD

The present invention relates to the wireless communication field, and particularly to the smart card remote wireless communication field.

BACKGROUND ART

An existing contact smart card, needing to be inserted into a smart-card terminal unit, must be ensured to be tightly connected with each contact of the interface of the unit; the smart card allows data exchange through contacting of the contact of the smart-card terminal unit with the contact of the smart card and realizes data exchange of the smart card via the standard communication protocol, and thus the contacts must be tightly connected for the contact smart card. As shown in FIG. 1, the drawing on the left shows that the smart card will be inserted into the socket of the unit, and the drawing on the right shows that all the contacts of the smart card have been tightly connected in the unit.

The contact smart card is extensively applied in such fields as telecommunication, finance and medical treatment etc. However, when the contact smart card is used in the corresponding service, it is required that the smart-card terminal unit (the unit that exchanges the data with the smart card according to the application protocol of the specific service) must be connected with the smart card and cannot be separated from it during the service process. Besides, there is a rigid physical mapping between the smart-card terminal unit and the inserted smart card; therefore a given type of smart card can only be used for the specific service.

Most of the existing smart cards with contacts are subjected to a series of international standards. The most basic and important standard is the ISO/IEC 7816 standard. This standard provides not only the physical and electrical characteristics of the smart card but also the transmission protocols to communicate with these smart cards. The standard defines the physical shape and the contacts assignment of such cards and, the electrical circuits of eight contacts (C1 Supply voltage, C2 Reset signal, C3 Clock signal, C4 Reservation, C5 Ground, C6 Variable supply voltage, C7 Data input/output, and C8 reservation). In addition to the ISO/IEC 7816 standard, there are some specific application protocols in the various specific fields where the smart card is probably applied; in China, for example, the SIM and USIM specifications are provided in the communication field, the PBOC specification is provided in the financial field, and all other fields have their own specific specifications. All these application protocols and specifications are established on the underlying protocols of ISO/IEC 7816 standard, and extend the upper-layer protocols of ISO/IEC 7816 standard.

The smart-card terminal unit and the smart card need to achieve the same specific application requirements simultaneously; that is, a specific application protocol is further needed in addition to the basic ISO/IEC 7816 standard for implementing such a service. For example, a mobile equipment can implement the telecommunication service by plugging in a SIM/USIM card, and a prepayment meter can be recharged and show the remaining quantity only after a smart card is inserted into the prepayment meter. The smart card and the smart-card terminal unit using application protocols different from each other are not compatible; sometimes even if in the same field, incompatible application protocols can still prohibit users from using the service; for example, a CDMA mobile equipment can not use a GSM SIM card and vice versa.

At present, both the smart card and the smart-card terminal unit must be connected with conductive contacts and operate in accordance with ISO/IEC 7816 standard, and both the smart-card terminal unit and the smart card have to be bound with the same application protocol, therefore, the specific service under the same application protocol makes it possible to be used only under this combination; for example, a mobile equipment and an SIM/USIM card, an ATM and a ATM card, a prepayment meter and a prepayment card, etc. Such a way is very inflexible, and the user needs to take multiple cards to implement into multiple different devices for different services; even in the same application field, a specified smart-card unit or smart card is also needed for using various services provided by different service providers or the same service provider; for example, in the telecommunication field, for the user who wants to switch between the multiple mobile business plans (these plans can be provided by different operators), if a plan A card provides a low-cost voice plan and a plan B card provides a low-cost data plan, a user who want to enjoy both low cost voice and data plans, will need to either swap the two different SIMs in and out of a single device to use different services, or have to carry two devices in order to use both of these SIM's plans. Such a design and arrangement is cumbersome and not practical in today's fast changing and diverse environment.

Therefore, a new smart card communication system needs to be provided, which can shield the physical mapping requirement between the smart-card terminal unit and the destination smart card, in order to realize flexibility and convenience required in the current fast changing and diverse environment.

SUMMARY OF INVENTION

In order to resolve one of the above technical problems, a remote wireless smart card is provided according to an example of the present invention, comprising: a smart-card model, used to be arranged in a smart-card terminal unit for conductive contacts between the card model and the smart-card terminal unit as well as the electrical signal transfer between the smart-card terminal unit and a control module; the control module, used for parsing and analyzing character frame in physical layer protocol and data link layer protocol between a smart-card terminal and the destination smart card, for the exchange of partial messages in application layer and for executing the communication protocol with a destination smart card control equipment; and a wireless communication module, used for wireless communication via a wireless network between the remote wireless smart card and the destination smart card control equipment.

A smart-card terminal unit is provided according to another example of the present invention, including the remote wireless smart card.

A remote wireless smart card communication system is provided according to yet another example of the present invention, including: the remote wireless smart card; a destination smart card control equipment, used for reading/writing and managing one or more destination smart cards as well as for controlling the communication with the wireless communication module and for parsing and analyzing the interface protocols between a smart-card terminal and the destination smart card.

In the remote wireless smart card and the smart-card terminal unit and communication system presented in the present invention, the smart-card terminal unit, separated from the contact smart card, is conductively connected to the remote wireless smart card, and communicates with the destination smart card via the remote wireless smart card; thus the destination smart card does not need to be conductively connected with the smart-card terminal unit, and only needs to be in the communication range of the remote wireless smart card to exchange data with the smart-card terminal unit; meanwhile, the remote wireless smart card shields the mapping relationship between the smart-card terminal unit and the destination smart card, and the control equipment and software can be added among them for automatically selecting the smart card for the corresponding service, thus allowing the remote wireless smart card to flexibly match the different smart card.

BRIEF DESCRIPTIONS OF THE DRAWINGS

The above and/or additional aspects and advantages of the present invention will become obvious and easy to be understood from the following examples described with reference to the drawings listed as follows.

DETAILED DESCRIPTION OF THE EMBODIMENTS

Figure 1:
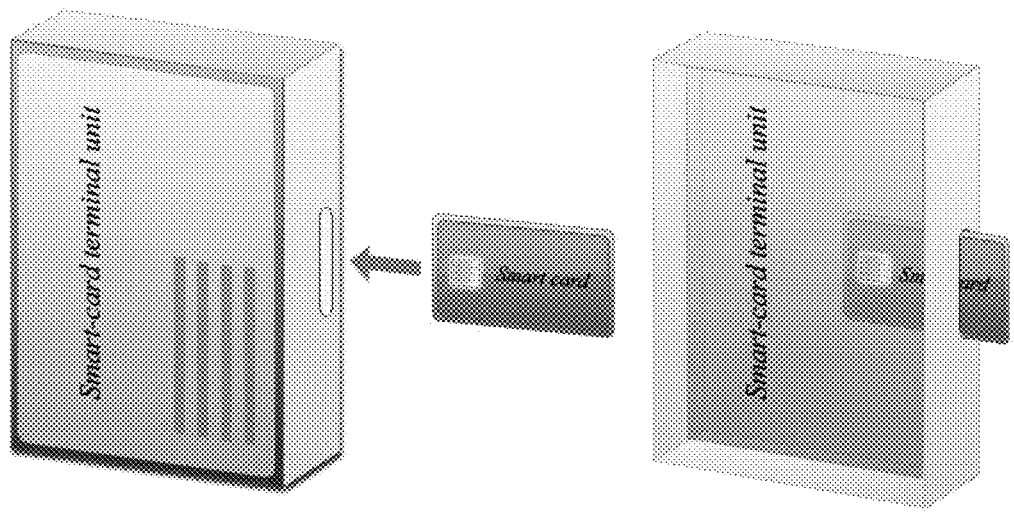
FIG. 1 is a schematic diagram of the method of connection of the smart-card terminal unit with the contact smart card.

The examples of the present invention will be described in detail in the following. The implementation examples are shown in the drawings, throughout which the same or similar labels are used to represent the same or similar elements or the elements with the same or similar functions. The examples described below with reference to the drawings are implementation examples and only used for the explanation of the present invention, and cannot be interpreted as limiting the present invention.

The present invention, presenting the concept of remote wireless smart card, separates the smart-card terminal unit from the contact smart card and connects the smart-card terminal unit directly to the remote wireless smart card, realizing the communication with the destination smart card via the remote wireless smart card; thus the destination smart card does not need to be conductively connected with the smart-card terminal unit, and only needs to be in the communication range of the remote wireless smart card to exchange data with the smart-card terminal unit; meanwhile, the remote wireless smart card shields the mapping relationship between the smart-card terminal unit and the destination smart card, and the control equipment and software can be added among them for automatically selecting the smart card for the corresponding service, thus allowing the remote wireless smart card to flexibly match the different smart card.

Figure 2:
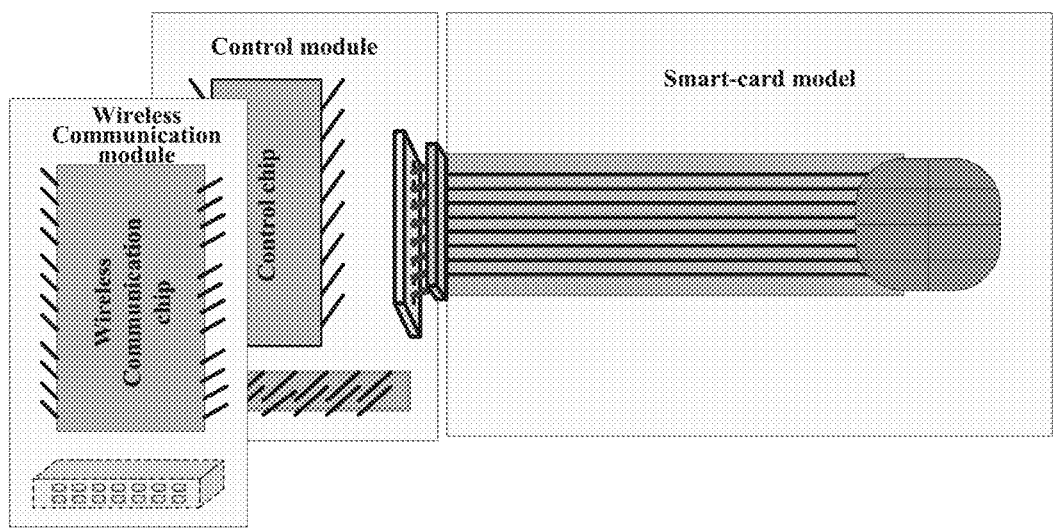
FIG. 2 is a schematic diagram of the remote wireless smart card composed of the wireless communication module, the control module and the card model.

As shown in FIG. 2, the remote wireless smart card according to the examples of the present invention includes the following components: a smart-card model, used to be arranged in a smart-card terminal unit for conductive contacts between the card model and the smart-card terminal unit as well as electrical signal transfer between the smart-card terminal unit and a control module; the control module, used for parsing and analyzing character frame in physical layer protocol and data link layer protocol, for the exchange of partial messages in application layer and for executing the communication protocol with a destination smart card control equipment; and a wireless communication module, used for wireless communication via a wireless network between the remote wireless smart card and the destination smart card control equipment.

Various components of the remote wireless smart card will be explained one by one in the following.

The control module parses and analyzes the electrical signal and interface protocol of the smart card, and simultaneously realizes the communication protocol with the destination smart card. It on one side controls behavior and data transmission of the wireless communication module, and on the other side receives the electrical signal transferred by the card model contacts according to electrical characteristics of physical connection of the smart card, parses it into standard data for transfer to the destination smart card, and converts the data of the destination smart card into an electrical signal that are returned to the smart-card terminal unit through the card model contacts.

In addition, the remote wireless smart card needs electric power for operation; therefore, the control module can include a power supply management module having the battery-and-charge management function, so as to supply power for the remote wireless smart card and support charge for the continuous supply of electricity. Moreover, an exterior module can also be used to provide the power supply support for the remote wireless smart card; for example, when the remote wireless smart card is integrated on the smart-card terminal unit, the smart-card terminal unit supplies power to the remote wireless smart card.

The wireless communication module uses the wireless technology for the wireless transfer, and realizes communication with the terminal unit of the destination smart card through the wireless network—wireless local area network (WLAN), mobile communications network (2G, 3G, 4G); the wireless module, according to scope and requirements of the application, can be divided into a terminal module of the wireless local area network standard, a terminal module of the mobile communications network standard, and a terminal module integrating both functions of the wireless local area network standard and the mobile communications network standard.

Figure 3:
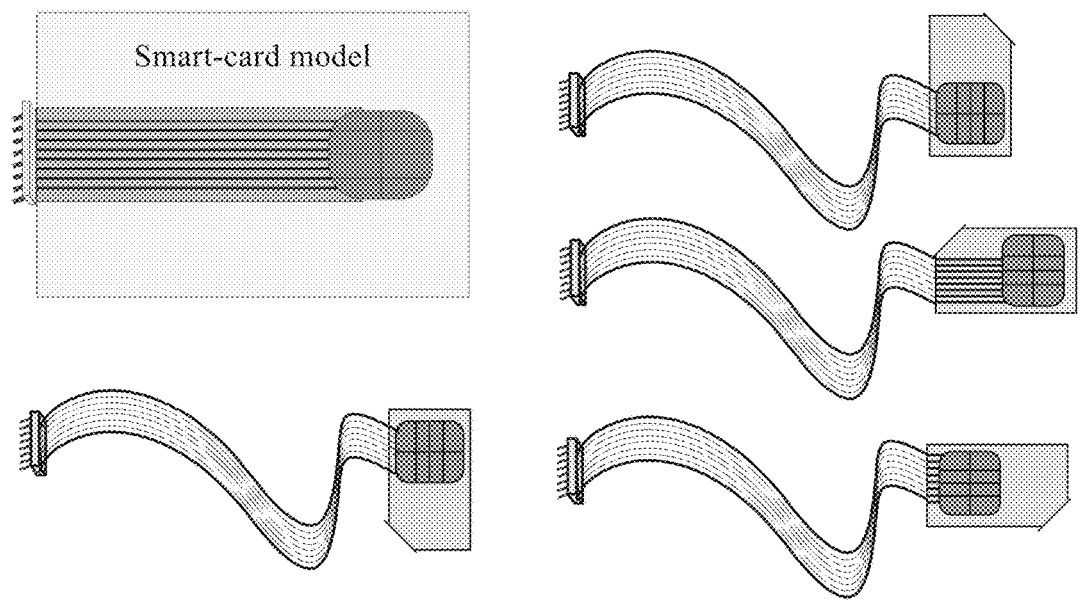
FIG. 3 shows the card model which imitates a real smart card with the contact area.
Figure 4:
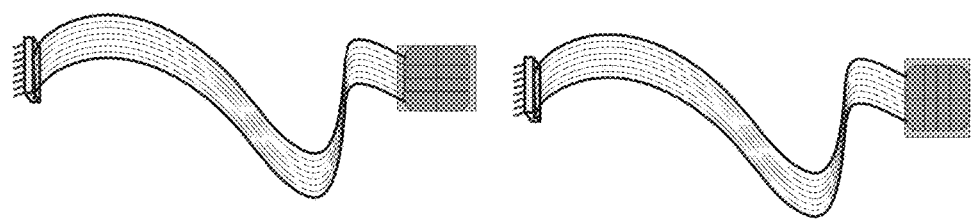
FIG. 4 shows the card model with the minimum contact area that can be flexibly configured.

The card model with the contact area is used for forming conductive contact with each contact of the smart-card terminal unit, providing the electrical signal transmission through the smart card interface of the smart-card terminal unit and the control module; the shape of the card model needs to be designed according to the socket of the actual smart-card terminal unit, so as to imitate the appearance of the real smart card. As shown in FIG. 3, for flexibly configuring different shapes of the smart card, a contact area in the minimum size is led out from the eight contacts as required by the standard, and is connected to the control module by the extension data line; as shown in FIG. 4, any required smart card can be configured by flexibly configuring the card model with the minimum contact area with the addition of a card connector meeting any shape requirement.

Figure 5:
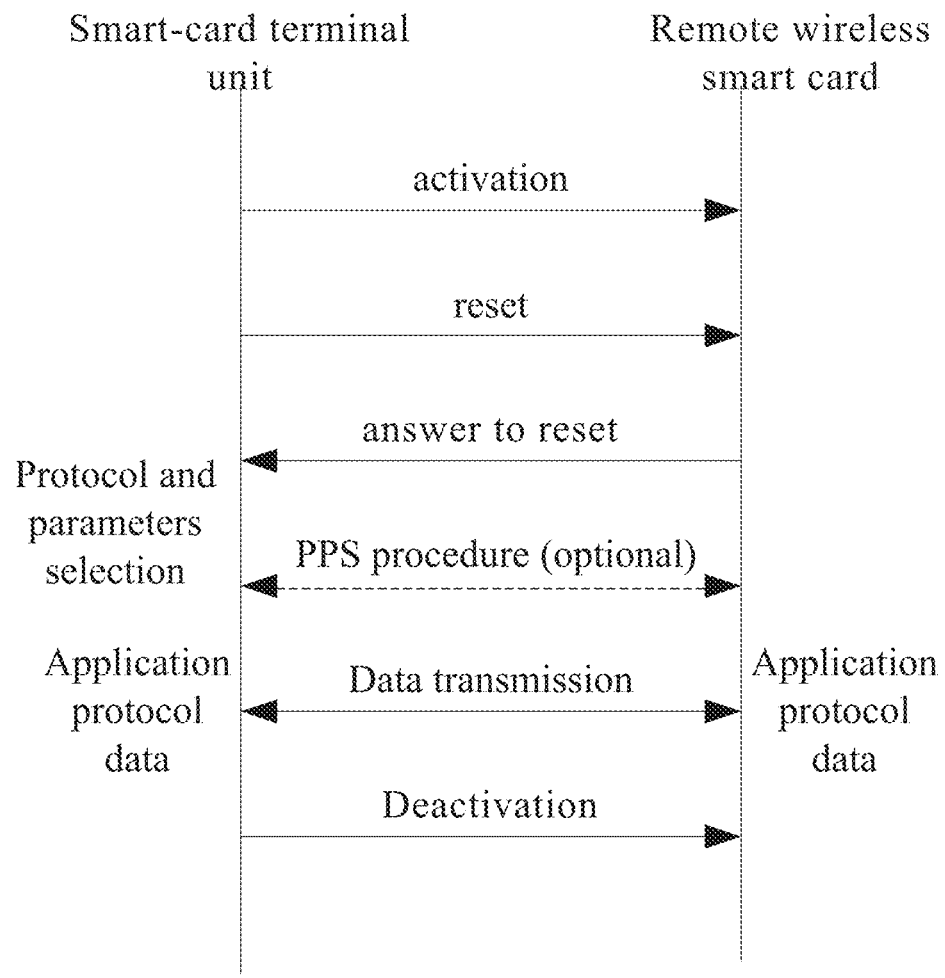
FIG. 5 is a flow chart of the main communication procedures between the smart card and the smart-card terminal unit.

The main communication procedures between the remote wireless smart card and the smart-card terminal unit is as shown in FIG. 5, including: activation (Activation), card reset (RST), card output Answer-to-Reset (ATR), data transmission and deactivation (Deactivation). The ISO/IEC 7816 standard defines the operating procedure of the smart card. The card output ATR gives operational requirements including data format for the subsequent data transfer, protocol parameters, protocol type, and historical characters; if the remote wireless smart card supports multiple parameters in ATR, after the remote wireless smart card sends ATR, the smart-card terminal unit identifies transmission parameters other than non-default values, and the smart-card terminal unit and the remote wireless smart card, according to self capacity, determine the finally used parameters by the procedure of protocol and parameters selection (PPS).

The remote wireless smart card matches a destination smart card assigned by the destination smart card control equipment. Specifically, the destination smart card control equipment, according to the actual business needs, preassigns the destination smart card before communication between the remote wireless smart card and the smart-card terminal unit, or assigns the destination smart card just during communication between the remote wireless smart card and the smart-card terminal unit.

Specifically, before communication between the remote wireless smart card and the smart-card terminal unit, the destination smart card control equipment preassigns the destination smart card; after the activation and reset operation of the smart-card terminal unit on card, the remote wireless smart card has known the information of the destination smart card, therefore, sends the ATR information of the destination smart card; afterwards, a transparent transmission path is established between the smart-card terminal unit and the destination smart card for transparent data transmission.

The destination smart card control equipment assigns the destination smart card just during communication between the remote wireless smart card and the smart-card terminal unit, after the activation and reset operation of the smart-card terminal unit on card, the remote wireless smart card returns the default ATR information according to the ISO/IEC 7816 standard, i.e. an explicit protocol and parameters that both the smart-card terminal unit and the smart card must support. In the data transmission stage, the smart-card terminal unit obtains the list of the applications by selecting and reading the record entries of Directory (DIR) file in file structure of smart card, and selects the specific Application Identifier (AID) and activates the proprietary application logic according to AID of the application; the remote wireless smart card transfers the request of application selection from the smart-card terminal unit to the destination smart card control equipment; the smart card control equipment selects the destination smart card and returns the list of the applications of one or more destination smart cards, then the smart-card terminal unit selects the suitable application to active according to the list of applications from the smart card control equipment.

Preferably, the card model is a contact smart-card model.

There may be a variety of designs for the integration method of the remote wireless smart card.

The First Approach

A remote wireless smart card is included, composed of the wireless communication module, the control module, and the card model only having the contact area, as shown in FIG. 2. The wireless communication module, only needing to be responsible for wireless communication, provides a set of external control interfaces—hardware and software interfaces, the hardware interface providing the communication physical interface (serial port, USB, SPI, etc.) by the electrical connector (pin, plug-in, contact, stitch, etc.) and providing the external data exchange function for the software interface through the hardware interface, the software interface providing a set of data stream protocols for controlling the wireless communication module and the data exchange with the wireless communication module. The control module is connected with the wireless communication module through the external electrical connector (slot, etc.), controlling connection and communication of the wireless module via the communication physical interface (serial port, USB, SPI, etc.). The control module is connected via the electrical connector (pin, plug-in, contact, stitch, etc.) with the eight contact extension lines on the card model, and analyses and reconstructs the electrical signal at the contact. The control module contains a set of control protocol software, which parses and analyses the protocol of the smart card-the smart-card terminal unit interface, controls the communication of wireless module and parses data stream protocol of the far-end destination smart card. The card model with the contact area is conductively connected with each contact of the smart-card terminal unit; the card model extends transmission of the electrical signals via the extension line, the other end of which is tightly connected with the control module via the electrical connector (pin, plug-in, contact, stitch, etc.). The extension line can be designed as actually required to be a circuit board (FPC, etc.) embedded into the card model and having higher flexibility.

The Second Approach

Figure 6:
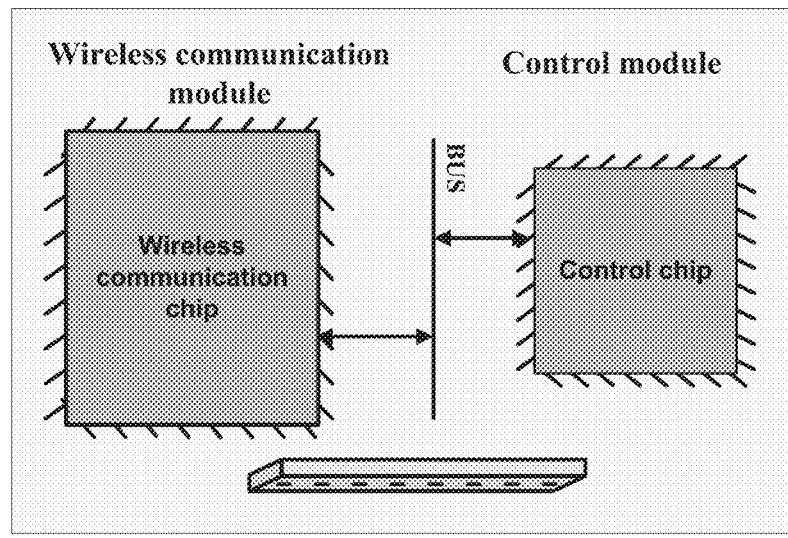
FIG. 6 is a schematic diagram of the remote wireless smart card integrated with the control chip and the wireless communication chip.

The control module is integrated with the wireless communication module, and connected with the card model having the contact area. There are the following two integration methods for the two modules:

The control module includes a separate control chip, and the wireless communication module includes a separate wireless communication chip, the two chips being connected via a bus; the control chip controls the wireless communication chip via the bus signal, the two chips being integrated on the same circuit board, as shown in FIG. 6.

Figure 7:
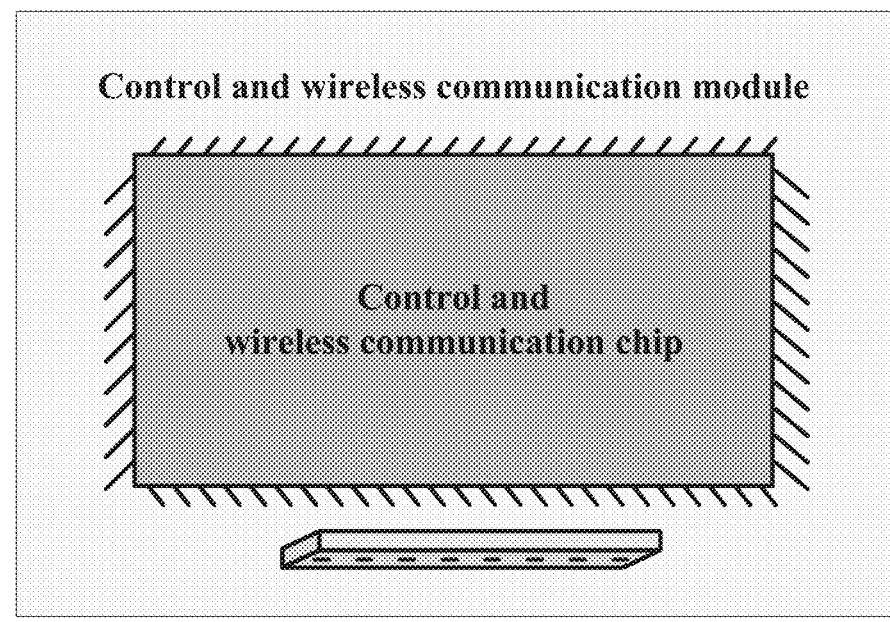
FIG. 7 is a schematic diagram of the remote wireless smart card integrated with the control and wireless communication chip.

The control module and the wireless communication module can also be used as a single control and wireless communication module, on which is integrated a single control and wireless communication chip, and thus only a software interface is needed for control and communication of the control module to the wireless communication module, as shown in FIG. 7.

Figure 8:
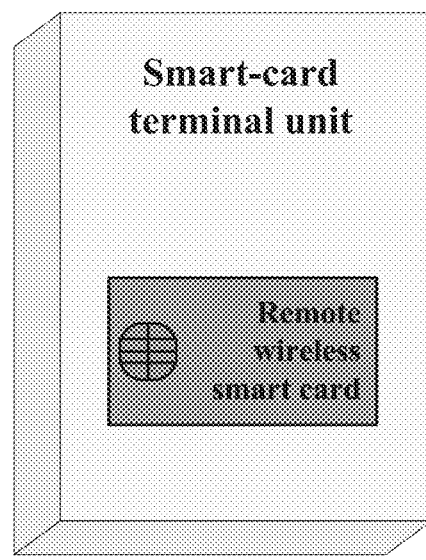
FIG. 8 is a schematic diagram of the smart-card terminal unit integrated with the remote wireless smart card.

Certainly, as shown in FIG. 8, the remote wireless smart card and the smart-card terminal unit can also be integrated together into an integral part of the smart-card terminal unit.

For example, the remote wireless smart card and the smart-card terminal unit can be integrated as a whole via the hardware connection; the remote wireless smart card, as a separate module, is integrated with the wireless communication function and control function and connected with the smart-card terminal unit via the hardware connection; the communication physical interface refers to the contacts interface between the interface of the remote wireless smart card and the smart-card terminal unit, and both the electrical connector can be used for ensuring the tight connection of various contacts of the physical interface.

Certainly, the remote wireless smart card and the smart-card terminal unit can also be integrated as a whole via the software; both the remote wireless smart card and the smart-card terminal unit discard the hardware connection, and instead directly use the software interface for data transmission, the data transmitted by the software interface still following the ISO/IEC 7816 standard.

Therefore, the remote wireless smart card provides a transparently transmission channel between the destination smart card and the smart-card terminal unit, and the destination data needing to be communicated by the smart-card terminal unit are still on the actual destination smart card. The remote wireless smart card needs to be remotely connected to the destination smart card and communicates with the data on the card, and the destination smart card control equipment needs to be added between the remote wireless smart card and the destination smart card for the communication and control between them. The destination smart card control equipment is connected with the destination smart card, providing the read/write function of the destination smart cards and managing the destination smart cards service; it is connected via the network with the remote wireless smart card, providing message transmission and parsing message protocol for the remote wireless smart card.

Therefore, the examples of the present invention further include a remote wireless smart card communication system. The remote wireless smart card, via the wireless communication module, allows connect to the network by wireless local area network (WLAN) or mobile communications network (2G\3G\4G); the destination smart card is connected with the smart card control equipment, and the destination smart card control equipment reads/writes and manages one or more destination smart cards and is connected to the remote wireless smart card. The destination smart card control equipment, according to the application scope, can either connects to the remote wireless smart card via the internal of the wireless local area network, or communicates with the remote wireless smart card via the internet in a wireless or wired way. The destination smart card control equipment and the remote wireless smart card are equivalent to have a master-slave or server-client relation, the destination smart card control equipment providing for the remote wireless smart card the function of assigning and reading/writing the destination smart card and negotiation and response the message with the remote wireless smart card.

For example, the link of the remote wireless smart card with the destination smart card control equipment and the way of selecting the destination smart card can include the following three modes:

One-to-One Card Reading Mode

Figure 9:
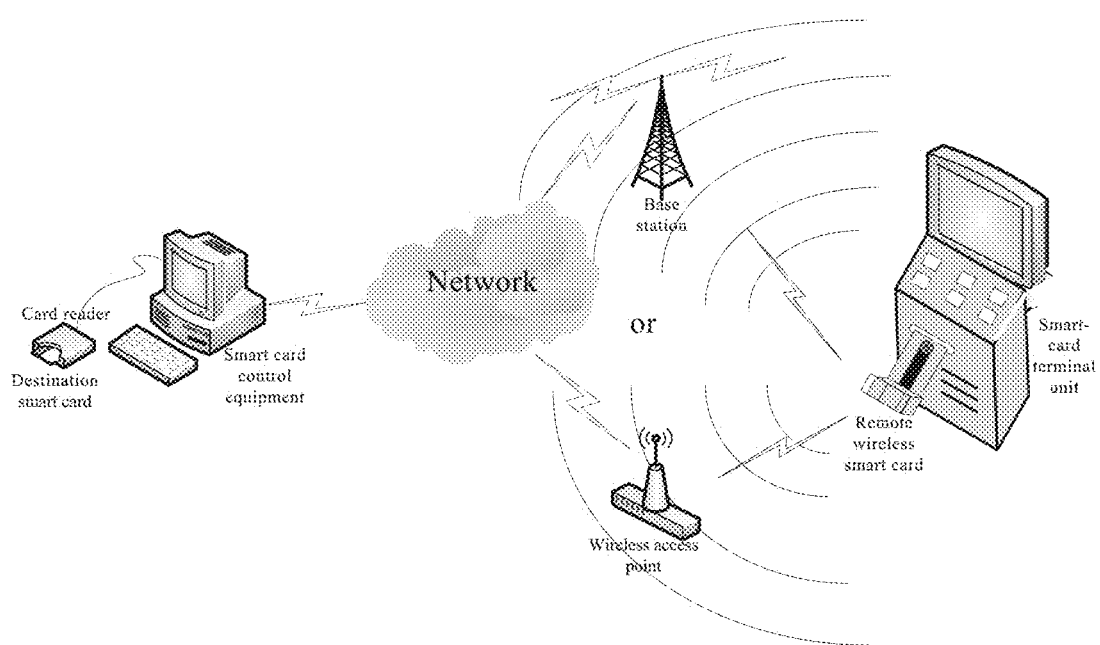
FIG. 9 shows the one-to-one connection of the remote wireless smart card with the destination smart card.

As shown in FIG. 9, the destination smart card control equipment includes a single card reader for reading/writing and managing the smart card, the destination smart card being inserted into the card reader, the destination smart card control equipment being connected with the card reader for reading/writing the destination smart card; the remote wireless smart card is connected to the network in a wireless way, then communicates via the network with the destination smart card control equipment, and sends the data to the destination smart card delivered from the destination smart card control equipment and receives the data from the destination smart card fed back by the destination smart card control equipment. Because only one destination smart card needs to be managed in the one-to-one card reading mode, no special management function is needed except only providing management of the temporary data of the single card; parsing the transmission data protocol over the remote wireless smart card, transferring the data to the destination smart card according to different data control protocols, and packing the data returned by the destination smart card according to the data control protocol and returning it to the remote wireless smart card.

In this mode, one remote wireless smart card can be used to adapt to a variety of smart-card terminal units, so long as the destination smart card mapping the corresponding smart-card terminal unit is inserted at the far end. However, the remote wireless smart card, because of different smart-card terminal units and thus for matching the destination smart card, requires the matched destination smart card to be manually inserted at the far end in advance.

One-to-Many Connection Mode

Figure 10:
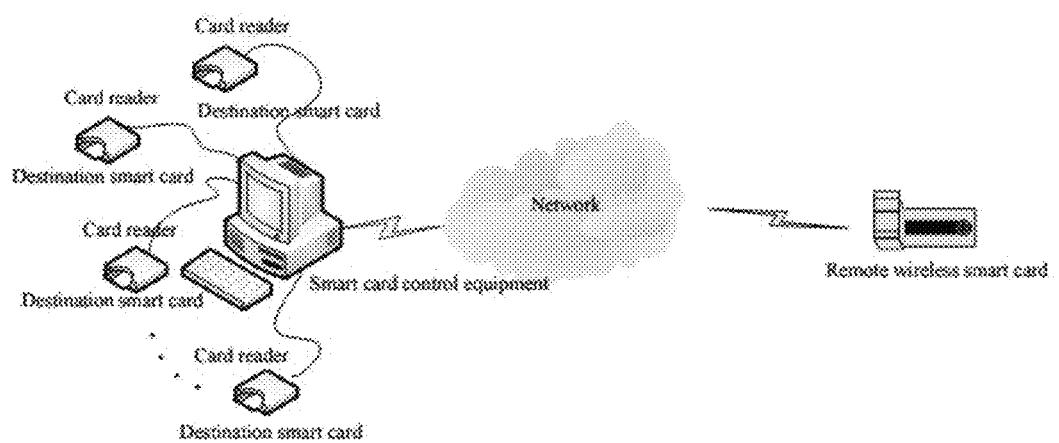
FIG. 10 shows the one-to-many connection of the remote wireless smart card with the destination smart card.

As shown in FIG. 10, the destination smart card control equipment includes multiple card readers for reading/writing and managing the multiple destination smart cards simultaneously, the destination smart card being inserted into the card reader, the destination smart card control equipment establishing a specific file (including attributes and key information of all the destination smart cards) for each of the connected destination smart cards; the destination smart card control equipment receives information from the single remote wireless smart card, automatically selects the matched destination smart card based on different data control protocols then extracts the data to the destination smart card, and packs the data returned by the destination smart card according to the data control protocol and returns them to the remote wireless smart card.

This mode, more flexible for matching of the smart-card terminal unit with the destination smart card, allows insertion of many smart cards at the far end and meets the matching requirements of the application, thus permitting usage of the remote wireless smart card on the multiple smart-card terminal units.

Many-to-Many Group Mode

Figure 11:
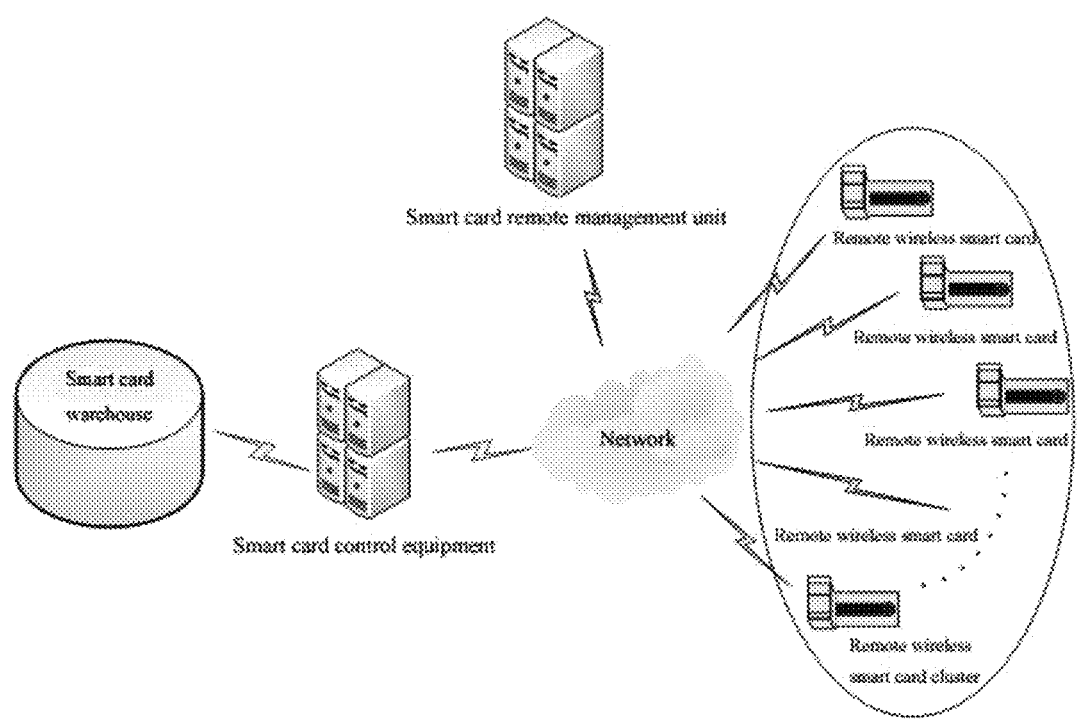
FIG. 11 shows the many-to-many connection of the remote wireless smart card with the destination smart card.

As shown in FIG. 11, the destination smart card control equipment includes a smart card warehouse having a smart card control box and a smart card control panel, into which are inserted mass, for example more than 1000 pieces, destination smart cards used for providing the reading/writing function of the mass smart cards. The destination smart card control equipment establishes a specific file (including attributes and key information of all the destination smart cards) for each of the connected destination smart cards, automatically selects the matched destination smart card based on different data control protocols then extracts the data to the destination smart card, and packs the data returned by the destination smart card according to the data control protocol and returns them to the remote wireless smart card. Moreover, the destination smart card control equipment not only provides the function of automatically selecting the destination smart card for one specific remote wireless smart card, but also can provide the function of automatically selecting the destination smart card for multiple or a great deal of remote wireless smart cards as well as the data transfer between the matched remote wireless smart card and destination smart card; therefore, the smart card control equipment further implements management of such many remote wireless smart cards and destination smart cards and one-to-one match of the one remote wireless smart card with the one destination smart card, thus avoiding the one-to-more problem, i.e. the problem with one remote wireless smart card simultaneously reading the multiple destination smart cards or the problem with the multiple remote wireless smart cards simultaneously visiting one destination smart card.

Correspondingly, various modes can also be included for selecting the destination smart card.

Manually Selected Destination Smart Card

As shown in FIG. 9 or 10, the destination smart card control equipment can connect one or more destination smart cards, and the user manually inserts the specified destination smart card at the side of the destination smart card control equipment. When the remote wireless smart card is inserted into the smart-card terminal unit, i.e. the action of plugging in the card, here the remote wireless smart card is connected with the destination smart card control equipment. Because the destination smart card can be known in advance, the destination smart card control equipment transmits the data between the destination smart card and the remote wireless smart card that, completely replacing the destination smart card, communicates transparently with the smart-card terminal unit.

Single Application Field Automatically Adapted Destination Smart Card

A single application field smart card is a smart card that can only match the same type of terminals and provide a single service, where security of reading/writing the file data needs to be guaranteed with the same security features and key authentication algorithm for consistent logical relationship of the smart-card terminal unit and the destination smart card.

As shown in FIG. 10 or 11, the destination smart card control equipment manages multiple or a cluster of destination smart cards, the remote wireless smart card is connected with the destination smart card control equipment, and the destination smart card control equipment assigns the destination smart card.

For example, the remote wireless smart card can be wirelessly informed of the current location information, and provide the information to the destination smart card control equipment; and the destination smart card control equipment uses the location information of the remote wireless smart card as the basis of assigning the destination smart card, and accordingly assigns the suitable destination smart card.

For example, when the mobile user uses a remote wireless smart card, the remote wireless smart card obtains the information of the current cell, and the destination smart card control equipment assigns the destination smart card with the same location, thus providing local call and data access services for the mobile user.

When the remote wireless smart card is integrated with the smart-card terminal unit, the remote wireless smart card can be wirelessly informed of the current location information, and further obtain the information of the smart-card terminal unit (e.g. the application scope, the Identifier, and the service type) through the external interface of the smart-card terminal unit; the remote wireless smart card provides the information to the destination smart card control equipment, and the destination smart card control equipment reassigns the suitable destination smart card with the same location of the remote wireless smart card and the information provided by the smart-card terminal unit as the basis of assigning the destination smart card.

For example: The mobile (2G, 3G or 4G) terminal module can provide the supported network mode and services (e.g. call and data access); the remote wireless smart card informs the destination smart card control equipment of the current location information as well as the attribute information of the mobile terminal module, and the destination smart card control equipment, according to the information and the specific assigning method, assigns to the remote wireless smart card the destination smart card having the lowest expenses or the highest speed or the best service experience, and the remote smart card can then provide for the mobile user the corresponding service having the lowest expenses or the highest speed or the best service experience.

Automatically and Intelligently Selected Destination Smart Card

A smart card remote management unit can be added for the entire smart card communication system, both managing all the destination smart cards and all the remote wireless smart cards, and managing all the smart-card terminal units. The smart card remote management unit is connected via the network with the destination smart card control equipment to obtain all the card profile information in the smart card warehouse; and the smart card remote management unit saves the information of the registered remote wireless smart card. When the remote wireless smart card applies for the destination smart card, it connects the smart card remote management unit in advance, which will assign the suitable destination smart card according to the application and inform the remote wireless smart card of the profile of the destination smart card; the remote wireless smart card is then connected with the smart card control equipment for obtaining the destination smart card matching the application of the smart-card terminal unit.

Moreover, the data control protocols between the remote wireless smart card and the destination smart card can implement the final data exchange between the destination smart card and the smart-card terminal unit. There may be three data control methods between the remote wireless smart card and the destination smart card.

One-by-One Data Transmission

The remote wireless smart card sends to the destination smart card each of the received command application protocol data unit (APDU) sent by the smart-card terminal unit, and returns to the smart-card terminal unit each of the response APDU returned by the destination smart card. Such a mode allows accurate transmission of each of the data units, thus allowing transparent and complete operation of the destination smart card.

Downloading Important Data and Only Transmission of Key Command Data

The remote wireless smart card divides the received data contents of the files sent by the destination smart card into three types: the important data, the optional non-critical data and the key command data. The important data refer to the permanent and mandatory data that can be obtained directly from the destination smart card by the reading command; the remote wireless smart card, when being connected to the destination smart card for the first time, first saves this type of data to the local memory system, and therefore this type of data can be returned to the smart-card terminal unit directly and locally by the remote wireless smart card; the optional non-critical data are of a type of optional data defined in the application protocol specification and only used for the additional transaction enhancements without affecting the results of the whole application session, and therefore this type of data can be provided with the virtual blank data by the remote wireless smart card; the key command data can only be calculated with the internal secret key of the destination smart card, each time the key command data obtained are not the same and cannot be calculated by one command transaction, and therefore this type of data must be wirelessly transmitted to the destination smart card each time and the response data calculated by the destination smart card are returned to the smart-card terminal unit.

Such a mode can enormously reduce the data transmission frequency, and the operation on the destination smart card is performed only at the transmission stage of the key command data. Because of the reduced frequency of the wireless exchange data, other data in addition to the key command data are returned directly by the local remote wireless smart card to the smart-card terminal unit, thus the speed increased enormously.

Core Application of the Artificial Actual Smart Card, Downloading Important Data and Secret Keys Information In this mode, the remote wireless smart card has all the data structures and secret keys computation functions of the destination smart card, but the contents and secret keys information of the data structures are unknown; the remote wireless smart card, when being connected to the destination smart card for the first time, first saves the important data and secret keys information to the local memory system, and the optional non-critical data is provided with the virtual blank data by the remote wireless smart card; therefore, all the operations concerning the destination smart card are performed to the smart-card terminal unit locally and directly by the remote wireless smart card. Such a mode needs only one time of data transmission, and all the operation about the destination smart card is locally completed by the remote wireless smart card.

In such a data transmission mode, the remote wireless smart card can simulate the data structure of the same transaction standard more easily. The remote wireless smart card can be compatible with the destination smart card of different application protocols, uses the corresponding application protocol stack when matching the destination smart card, and can completely and locally simulate all the functions of destination smart card after obtaining the important data and secret keys of the destination smart card.

In this mode, the remote wireless smart card obtains the important data and secret keys of the destination smart card at a time, and afterward all the data are returned by the local remote wireless smart card directly to the smart-card terminal unit, thus having the highest speed.

All the above embodiments are only the preferred embodiments of the present invention. It should be indicated for those of ordinary skill in the art that some improvement and retouching can also be made under the premise of not departing from the principle of the present invention, and should also be regarded as within the scope of protection of the present invention.

What is claimed is:

1. A remote wireless smart card comprising:
   a smart-card model, a control module and a wireless communication module:
   wherein the smart card model is configured to be arranged in a smart-card terminal unit for conductive contacts between the smart card model and a smart-card terminal unit as well as electrical signal transfer between the smart-card terminal unit and a control module;
   wherein the control module, is configured for being used for parsing and analyzing an interface protocol between a smart-card terminal unit and a destination smart card and for executing communication protocol with a destination smart card control equipment and the control module is connected via the electrical connector with the smart-card model, said parsing comprising receiving an electrical signal transfered by the smart card model according to electrical characteristics of the smart card and parsing it into standard data for transfer to the destination smart card; and
   wherein the wireless communication module is configured to be used for wireless communication via a wireless network between the remote wireless smart card and the destination smart card control equipment, and the wireless communication module is connected via hardware (providing by the electrical connector) or software (providing a set of data stream protocols) interface with the smart-card model.

2. The remote wireless smart card according to claim 1, wherein:
   the control module is used for controlling the wireless communication and data dispatch of the wireless communication module, receiving the electrical signal transferred by the card model according to the electrical characteristics of physical connection of the smart card, parsing it into a standard data format to be sent outwards, and receiving data from outside before converting the data into an electrical signal for the card model.

3. The remote wireless smart card according to claim 1 further comprising:
   a power supply management module used for supplying power to the remote wireless smart card.

4. The remote wireless smart card according to claim 1, wherein an ISO/IEC 7816 protocol is adopted for signal exchange between the card model and the smart-card terminal unit.

5. The remote wireless smart card according to claim 4, wherein protocol parameters and protocol types of the signal exchanged are determined via a negotiation mechanism by the card model and the smart-card terminal unit.

6. The remote wireless smart card according to claim 5, wherein a protocol for specific fields is adopted for the data exchange between the control module and the smart-card terminal unit.

7. The remote wireless smart card according to claim 6, wherein one destination smart card is pre assigned to the remote wireless smart card.

8. The remote wireless smart card according to claim 6, wherein the remote wireless smart card is assigned to one or more destination smart cards in a communication process between the remote wireless smart card and the smart-card terminal unit.

9. The remote wireless smart card according to claim 1, wherein the card model is a contact smart-card model.

10. The remote wireless smart card according to claim 1, wherein the control module includes a control chip, and the wireless communication module includes a wireless communication chip, the control chip and the wireless communication chip being integrated on a same circuit board and connected via a bus.

11. The remote wireless smart card according to claim 1, wherein the control module and the wireless communication module are integrated into a control and wireless communication chip, the control module and the wireless communication module communicating via a software interface.

12. A smart-card terminal unit comprising the remote wireless smart card according to claim 1.

13. The smart-card terminal unit according to claim 12, wherein the remote wireless smart card and the smart-card terminal unit are connected via a contact, a pin, a slot or a software interface.

14. The smart-card terminal unit according to claim 12, wherein the smart-card terminal unit transfers attribute information of itself to the remote wireless smart card for transfer; and the smart-card terminal unit selects the destination smart card as required from a group consisting of one or more destination smart cards assigned to the remote wireless smart card.

15. A remote wireless smart card communication system comprising:

the remote wireless smart card according to claim 1; and a destination smart card control equipment, used for reading/writing and managing one or more destination smart cards as well as for controlling the communication with the wireless communication module and for parsing and analyzing the interface protocol between a smart-card terminal and the destination smart card.

16. The remote wireless smart card communication system according to claim 15, wherein:

the destination smart card control equipment includes a single card reader used for reading/writing and managing the single destination smart card, the destination smart card control equipment receives information from the single remote wireless smart card and feeds back data of the destination smart card; alternatively, the destination smart card control equipment includes the multiple card readers used for simultaneously reading/writing and managing the multiple destination smart cards; the destination smart card control equipment receives information from the single remote wireless smart card, selects the matched destination smart card and feeds back data of the destination smart card; alternatively, the destination smart card control equipment includes a smart card warehouse and is used for reading/writing and managing the mass destination smart cards, the destination smart card control equipment receives information from the multiple remote smart cards, selects the matched destination smart card and feeds back the data of the destination smart card.

* * * * *